US009961203B2

United States Patent
Cordell et al.

(10) Patent No.: US 9,961,203 B2
(45) Date of Patent: May 1, 2018

(54) QUALITY ASSURANCE CONFIGURATION FOR REMOTE AGENT COMMUNICATION

(71) Applicant: Language Line Services, Inc., Monterey, CA (US)

(72) Inventors: Jeffrey Cordell, Carmel, CA (US); James Boutcher, Carmel, CA (US); Lindsay D'Penha, Carmel, CA (US)

(73) Assignee: Language Line Services, Inc., Monterey, CA (US)

( * ) Notice: Subject to any disclaimer, the term of this patent is extended or adjusted under 35 U.S.C. 154(b) by 0 days. days.

(21) Appl. No.: 15/041,819

(22) Filed: Feb. 11, 2016

(65) Prior Publication Data

US 2017/0237857 A1 Aug. 17, 2017

(51) Int. Cl.
*H04M 3/51* (2006.01)
*G06Q 10/06* (2012.01)

(52) U.S. Cl.
CPC .... *H04M 3/5175* (2013.01); *G06Q 10/06395* (2013.01)

(58) Field of Classification Search
CPC ........................ G06Q 10/06395; H04M 3/5175
USPC ........................ 379/256.01–266.08
See application file for complete search history.

(56) References Cited

U.S. PATENT DOCUMENTS

| | | | | |
|---|---|---|---|---|
| 9,641,686 | B1 * | 5/2017 | Johansson | H04M 3/5235 |
| 2008/0025493 | A1 * | 1/2008 | Paras | H04M 3/5125 |
| | | | | 379/265.12 |
| 2009/0274292 | A1 * | 11/2009 | Diethorn | H04M 3/5232 |
| | | | | 379/265.11 |
| 2015/0071415 | A1 * | 3/2015 | Thomson | H04M 3/5175 |
| | | | | 379/8 |

* cited by examiner

*Primary Examiner* — Harry S Hong
(74) *Attorney, Agent, or Firm* — Patent Ingenuity, P.C.; Samuel K. Simpson

(57) ABSTRACT

An apparatus includes a data storage device that stores remote agent quality assurance code and communication session code. Further, the apparatus includes a data capture device that captures data associated with a remote agent positioned in proximity to the data capture device. In addition, a processor receives a request from an agent routing platform for a service provided by the remote agent through a communication session between the remote agent and a user requesting the service. The processor executes the remote agent quality assurance code to determine that at least a portion of the captured data is non-compliant with the one or more quality assurance policies provided by the agent routing platform. Further, the processor executes the remote agent quality assurance code to provide one or more indicia of non-compliance.

20 Claims, 12 Drawing Sheets

QUALITY ASSURANCE CONFIGURATION FOR REMOTE AGENT COMMUNICATION

BACKGROUND

1. Field

This disclosure generally relates to the field of communication. More particularly, the disclosure relates to computer implemented communication platforms that provide services via remote human agents.

2. General Background

Current call centers provide a variety of services via human agents located at the call centers. For instance, a customer or potential customer may call a telephone number and obtain a service by speaking with a human agent at the call center. As an example of such a service, a customer may call a language interpretation/translation provider to request language interpretation/translation services via a human language interpretation/translation provider.

Further developments have allowed entities to provide such services via remote human agents, i.e., human agents that are not situated in a call center. For instance, such entities may utilize Web Real-Time Communication ("WebRTC"), which allows for browser-to-browser communication between a human agent and a customer. Such communication may include video and/or voice. As a result, such human agents may provide such services from a computing device at their homes rather than having to be situated in a call center. Therefore, an entity is able to reduce costs associated with a human agent situated in a call center.

Yet, such configurations do not provide any form of quality assurance. As a WebRTC session occurs solely between the remote human agent and the customer, the entity does not have any mechanism for ensuring that the remote human agent is providing a quality product that is in accordance with the entity's policies. For instance, a remote human agent may be wearing particular clothing that is not in accordance with such policies, situated in a noisy environment in which the customer is not able to adequately hear the remote human agent, seated in a manner in which the customer is not able to view the remote human agent, etc. As a result, entities currently cannot provide a product via remote human agents that provides a reliable and consistent quality.

SUMMARY

An apparatus includes a data storage device that stores remote agent quality assurance code and communication session code. Further, the apparatus includes a data capture device that captures data associated with a remote agent positioned in proximity to the data capture device. In addition, the apparatus includes a processor that receives a request from an agent routing platform for a service provided by the remote agent through a communication session between the remote agent and a user requesting the service.

The processor executes the remote agent quality assurance code to determine that at least a portion of the captured data is non-compliant with the one or more quality assurance policies provided by the agent routing platform. Further, the processor executes the remote agent quality assurance code to provide one or more indicia of non-compliance. In addition, the processor executes the remote agent quality assurance code to determine compliance with the one or more quality assurance policies subsequent to said providing of the one or more indicia. The processor also executes the communication session code subsequent to said determination of compliance to establish the communication session.

A computer implemented platform is also provided. The computer implemented platform includes a processor that receives, from a user, a request for a service provided by a remote agent, selects the remote agent to establish a communication session between a remote agent computing device and a user computing device, receives one or more artifacts in real time or substantially real time during the communication session as the service is being provided, analyzes the one or more artifacts to determine compliance with one or more quality assurance policies, and sends a message of non-compliance to the remote agent computing device.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A computer implemented quality assurance configuration, which shall be referred to as the quality assurance configuration, is provided to ensure that a communication session between a remote agent and a user occurs according to criteria determined by an entity from which the communication session was requested by the user. The quality assurance configuration may analyze parameters prior to initiation of the communication session, during the communication session, and after the communication session to provide such quality assurance. As a result, the entity utilizing the remote agent is able to monitor the quality of the service provided by the remote agent in a manner that allows the entity to ensure compliance with policies of the entity.

The quality assurance configuration improves the functionality of a computer by improving the accuracy of the computer in providing the communication session. For instance, the quality assurance configuration may be utilized to automatically determine optimal lighting, sound, image quality, network bandwidth, etc. so that the computer provides the communication session according to an improved quality.

The communication session allows the remote agent to provide a service to the user. As an example, the service may be language interpretation/translation. Various other types of services may also be utilized.

Figure 1:
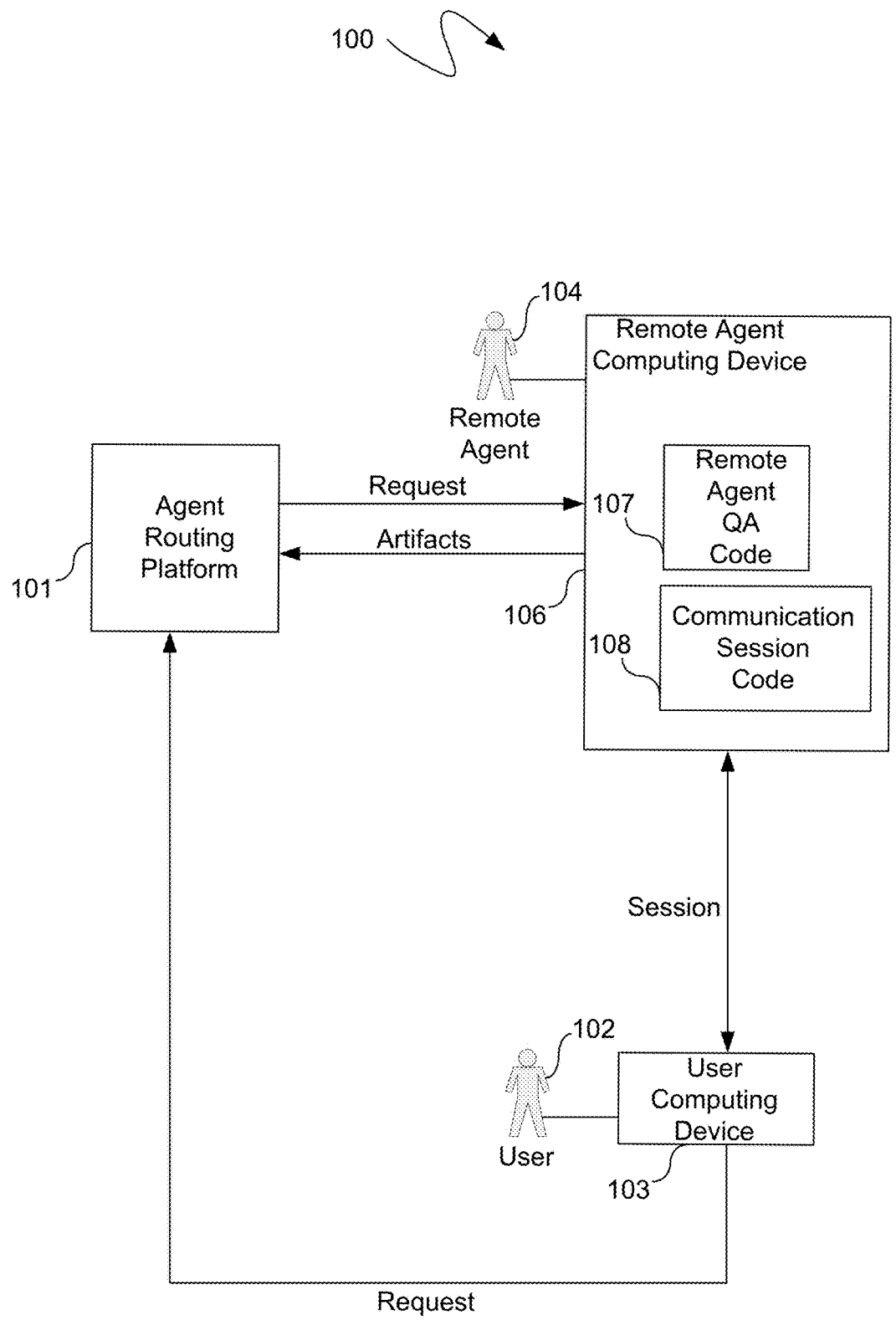
FIG. 1 illustrates a computer implemented quality assurance ("QA") system.

FIG. 1 illustrates a computer implemented quality assurance system 100. The computer implemented quality assurance system 100, which shall be referred to as the quality assurance system 100, has an agent routing platform 101. The agent routing platform 101 receives, from a user 102 via a user computing device 103, a request for a service provided by an agent. The agent routing platform 101 determines the availability of a remote agent 104 and routes the request to a remote agent computing device 106 of the remote agent 104. Further, the remote agent computing device 106 establishes a communication session with the user computing device 103 so that the remote agent 104 may provide the requested service to the user 102. As an example, the communication session may be a browser-to-browser video session, e.g., via WebRTC, that allows the user 102 to view the remote agent 104 via the user computing device 103 and allows the remote agent 104 to view the user 102 via the remote agent computing device 106. For instance, the remote agent computing device 106 may store communication session code 108 that allows the communication session to be establishes between the user computing device 103 and the remote agent computing device 106. Alternatively, the communication session code 108 may be stored on the user computing device 103. As yet another alternative, the communication session code 108 may be stored on the remote agent computing device 106 and the user computing device 103.

Further, the remote agent computing device stores remote agent QA code 104 for preconfiguring a communication session at the remote agent computing device 106 to comply with policies established by the agent routing platform for QA compliance. In other words, the remote agent QA code 107 automatically calibrates and/or automatically provides calibration feedback to the remote agent 104 to configure the remote agent computing device 106, environmental conditions, etc. to comply with the QA policies of the agent routing platform 101 prior to initiation of the session between the remote agent 104 and the user 102.

In addition or as an alternative, the remote agent QA code 107 may be configured to communicate with the agent routing platform 101 or a system associated therewith to obtain real-time feedback or substantially real-time feedback during the communication session. As a result, the remote agent 104 is able to adjust the remote agent computing device 106, environmental conditions, etc., during the communication session. For example, an environmental condition that may have complied with the QA policies of the agent routing platform 101 prior to initiation of the session may have changed during the communication session, e.g., noise level change in surrounding area. As a result, the agent routing platform 101 or a system associated therewith is able to actively monitor the communication session in real-time or substantially real-time to ensure compliance with the QA policies.

The user computing device 103 and the remote agent computing device 106 may be a personal computer ("PC"), laptop computer, tablet device, smartphone, smart wearable device, etc. Therefore, the remote agent computing device 106 may be a mobile device that is moved to various locations by the remote agent 104. Accordingly, the remote agent QA code 107 allows for pre-session and/or real-time session QA compliance.

FIGS. 2A-2D illustrate examples of various display screens displayed by a display screen 201 that is integrated into or in operable communication with the remote agent computing device 106. Various devices such as an image capture device 202, e.g., camera, and an audio capture device 203, e.g., microphone, may be integrated into or in operable communication with the remote agent computing device 106 so that video data, audio data, etc., may be captured by the remote agent computing device 106 to determine QA compliance prior to a communication session or during a communication session.

Figure 2A:
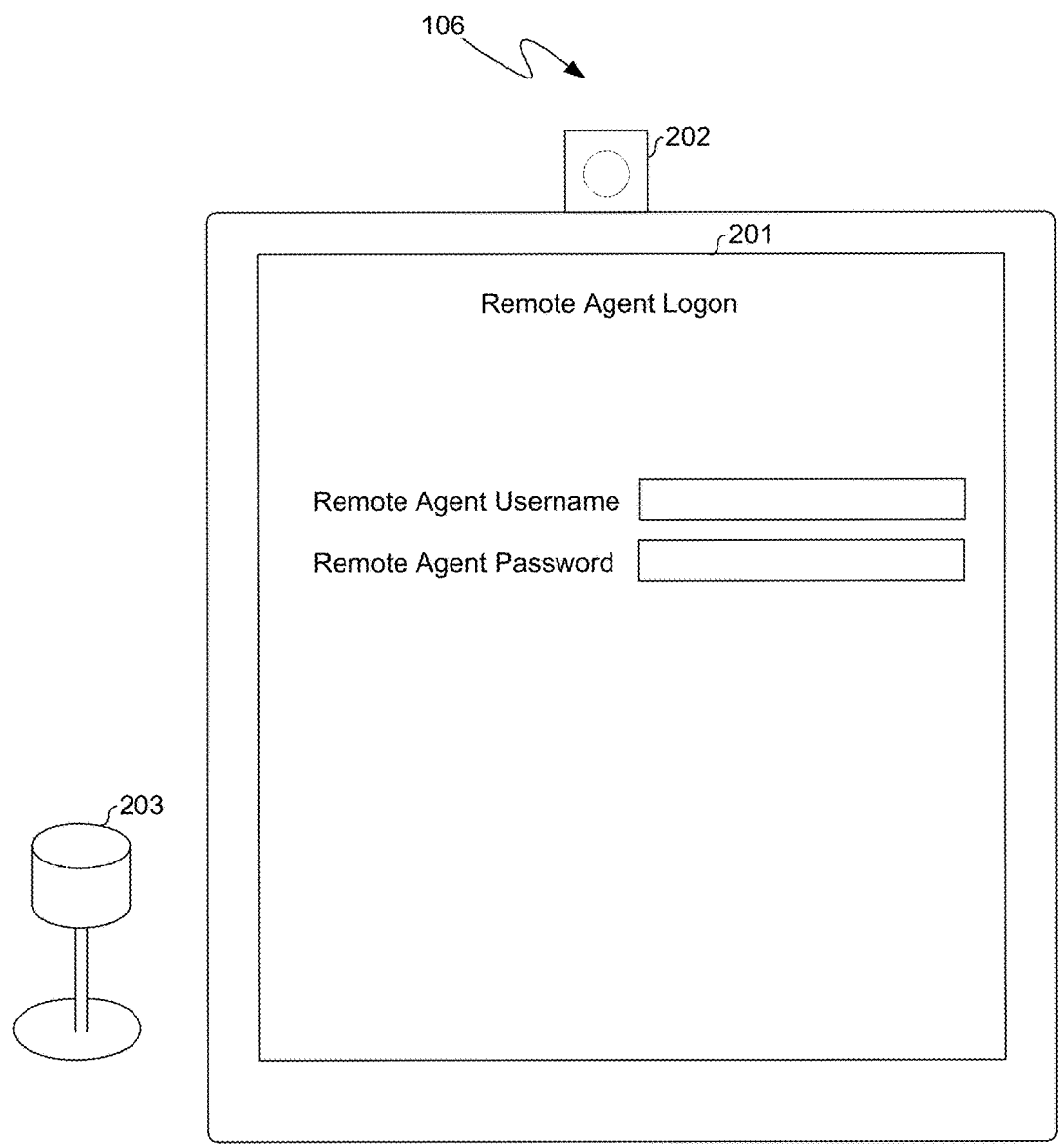
FIG. 2A illustrates an example of a remote agent logon screen displayed by the display screen.

FIG. 2A illustrates an example of a remote agent logon screen displayed by the display screen 201. The remote logon screen allows the remote agent 104 to logon to the agent routing platform 101 or a system associated with the agent routing platform 101. By logging on to the agent routing platform 101 or a system associated with the agent routing platform 101, the remote agent 104 informs the agent routing platform 101 that the remote agent 104 is available to perform work. As a result, the agent routing platform 101 is aware of that the remote agent 104 is available when determining what agent a communication should be routed to for working on a service request of the user 102.

Prior to routing a communication request to the remote agent 104, the agent routing platform 101 may request an acknowledgement from the remote agent QA code 107 stored on the remote agent computing device 106 that the remote agent computing device 106, environmental conditions, etc., as captured by data capture devices such as the image capture device 202 and the audio capture device 203 are in compliance with the QA policies of the agent routing platform 101. Alternatively, the communication request may be routed to the remote agent 104, but establishment of the communication session between the remote agent computing device 106 and the user computing device 103 may be prevented until the remote agent QA code 107 stored on the remote agent computing device 106 provides the acknowledgement of QA compliance to the agent routing platform 101.

For example, the remote agent computing device 106 may be asked by the agent routing platform 101 to perform testing to determine if the enough network bandwidth is present to provide a particular quality of video, audio, etc. Various tests may involve the remote agent QA code 107 stored on the remote agent computing device 106 requesting input from the remote agent 104. For example, the remote agent 104 may be asked to provide various audio input to via the audio capture device 203 to ensure that current network bandwidth is enough based upon the audio input, adequate functioning of the audio capture device 203, etc.

Figure 2B:
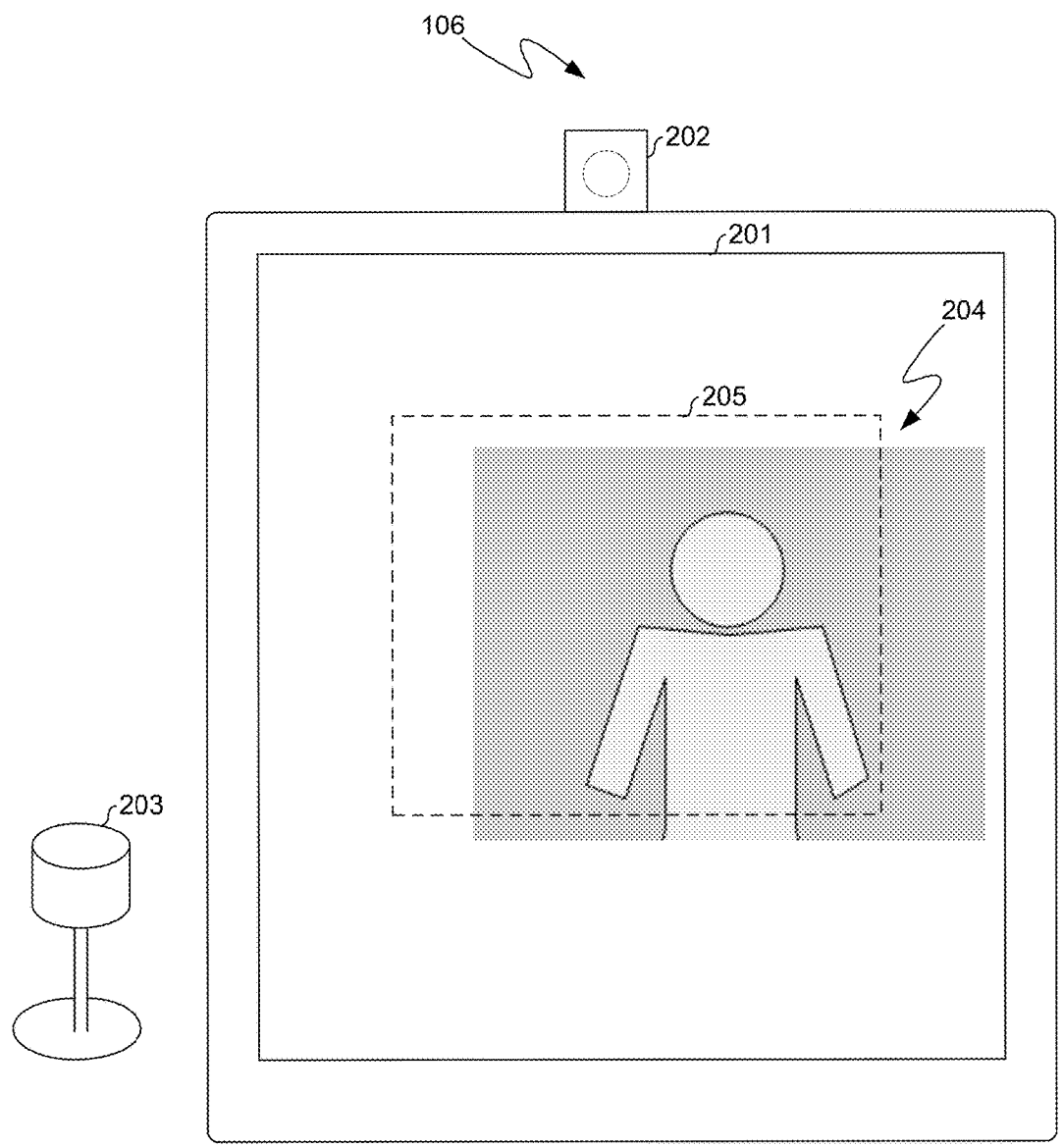
FIG. 2B illustrates an example of calibration feedback that is provided to the remote agent prior to initiation of a communication session with the user.

FIG. 2B illustrates an example of calibration feedback that is provided to the remote agent 104 prior to initiation of a communication session with the user 102. The remote agent QA code 107 stored on the remote agent computing device 106 may request that the remote agent 104 perform image capture with the image capture device 202 to capture an image 204 of the remote agent 104 as the remote agent 104 would be positioned in front of the remote agent computing device 106 for the communication session. The QA code 107 stored on the remote agent computing device 106 may then display the image 204 with various feedback so that the remote agent 104 may adjust the remote agent computing device 106, environmental conditions, etc., to comply with the QA policies of the agent routing platform 101. The QA code 107 stored on the remote agent computing device 106 may determine what adjustments are necessary for compliance with the QA policies and provide such adjustments via feedback displayed by the display screen 201, outputted by an audio speaker integrated into or in operable communication with the remote agent computing device 106, etc.

For instance, the QA code 107 stored on the remote agent computing device 106 may display an overlay 205 that illustrates positioning on the display screen 201 that would be in compliance with the QA policies. As illustrated in the example of FIG. 2B, the image 204 is to the right of the overlay 205, which is more centered in the middle of the display screen 201 to comply with QA policies that necessitate a centered view of the remote agent 104 by the user 102. Therefore, the remote agent 104 is able to adjust the image capture device 202, the remote agent computing device 106, a seating apparatus proximity to the remote agent computing device 106, etc. so that the image 204 is positioned within the overlay 205 to comply with the QA policies. For instance, the display screen may display a live video feed of image data of the remote agent 104 captured by the image capture device 202 so that the remote agent 104 may determine when the remote agent computing device 106 is calibrated to comply with the QA policies. As another example, feedback such as arrows or other indicia may be displayed by the QA code 107 on the display screen 201 to provide feedback to the remote agent 104 as to which direction adjustments should be provided.

Further, the QA code 107 stored on the remote agent computing device 106 may display various markings to provide feedback as to portions of the image 104 that are not in compliance with the QA policies. For example, a marking may be provided on a particular portion of a shirt worn by the remote agent 104 to inform the remote agent 104 that the shirt is wrinkled in that area. As another example, a marking may be provided in a background area of the image 204 to inform the remote agent 104 that the lighting in that portion does not meet QA policy requirements. Further, a marking may be provided on the image of the remote agent 104 to identify a portion of the remote agent 104 that is not viewable, e.g., the head of the remote agent 104 may be turned too much away from the image capture device 202. Therefore, the remote agent 104 can adjust positioning until the marking disappears, which provides feedback to the remote agent 104 that the viewing angle, proximity of the remote agent 104 to the image capture device 202, panning, etc., are in compliance with the QA policies.

A variety of indicia such as overlays, markings, etc. may each be associated with a particular QA policy. Further, such indicia may have different colors, shapes, etc. to distinguish one indicium from another indicium.

Accordingly, in various embodiments, some of the calibration feedback may be directly determined by the remote agent computing device 106 via the remote agent QA code 107 without further analysis by the agent routing platform 101. The remote agent computing device 106 may receive various QA policies from the agent routing platform 101, which the remote agent computing device 106 may utilize as criteria to determine if QA policies have been met.

In various other embodiments, some of the calibration feedback is obtained by the remote agent computing device 106 from the agent routing platform 101 after the remote agent computing device 106 sends video and/or audio artifacts captured at the remote agent computing device 106 to the agent routing platform 101 for analysis. For example, after logging in to the agent routing platform 101, the remote agent 104 may be prompted by the QA code 107 executed by the remote agent computing device 106 to read a script that is recorded by the image capture device 202 and the audio capture device 203. The remote agent computing device 106 then sends a video artifact, or possibly an image artifact, and an audio artifact to the agent routing platform 101 for analysis.

In various embodiments, the agent routing platform 101 or a system associated with the agent routing platform 101 automatically performs an analysis on the artifacts received from the remote agent computing device 106. For example, the analysis may determine whether or not the remote agent 104 read the script correctly. Such analysis may also be utilized to compare an audio artifact to a voice biometric of the remote agent 104 to ensure that the remote agent is the human agent that logged on to the agent routing platform 101. As another example, the analysis may determine whether any background noise was present during the reading of the script. As yet another example, the analysis may determine whether audio quality met a predetermine threshold of quality. As another example, the analysis may determine whether or not any packets from the video stream and/or audio stream were lost during communication to ensure that the network connection provides a reliable method of communication.

Figure 2C:
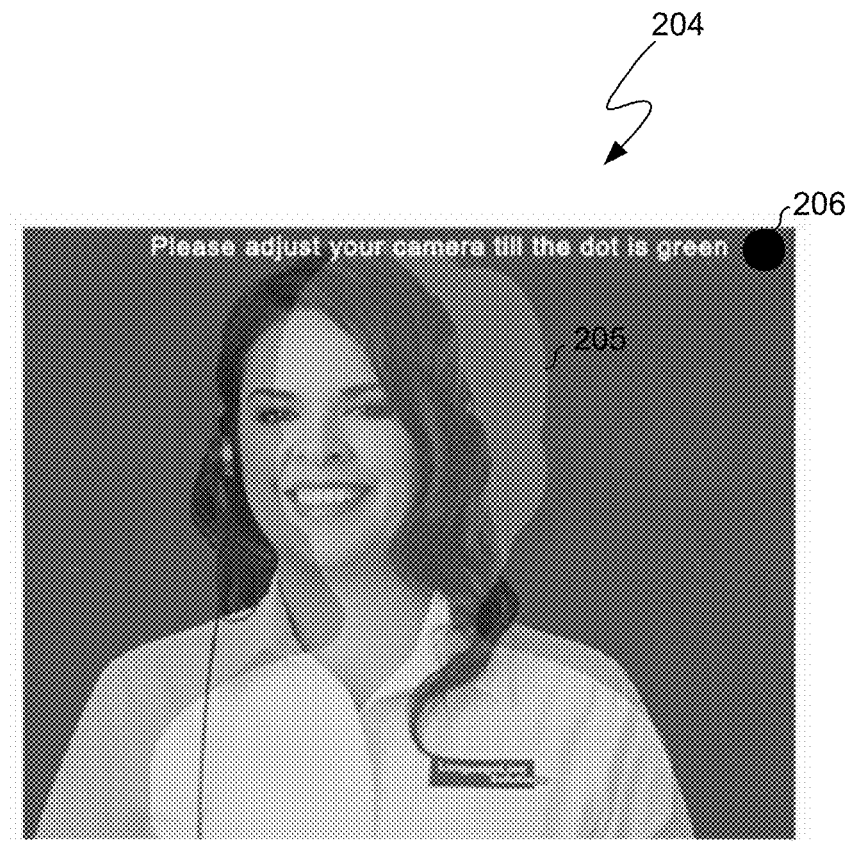
FIG. 2C illustrates an example screenshot of the image illustrated in FIG. 2B.
Figure 2D:
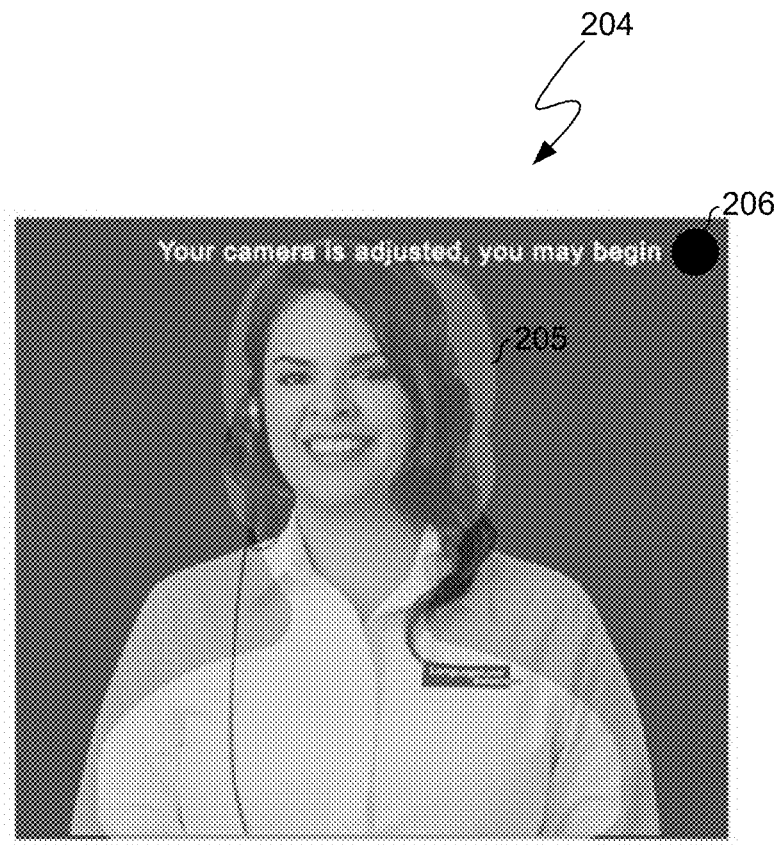
FIG. 2D illustrates an example screenshot of the image illustrated in FIG. 2B in which the real time or substantially real time image of the remote agent complies with the QA policies.

FIG. 2C illustrates an example screenshot of the image 204 illustrated in FIG. 2B. The remote agent 104 may perform real time adjustment based on the display of the image 204 with respect to the overlay 205. In various embodiments, a prompt indicium 206 prompts the remote agent 104 to perform one or more adjustments to comply with the QA policies. As an example, the prompt indicium 206 may be a red circle that is provided with a message that requests that the remote agent 104 perform adjustments to the image capture device 202, the audio capture device 203, environmental conditions, etc., until a green circle is displayed. For instance, the real time or substantially real time image of the remote agent 204 allows the remote agent 204 to perform adjustments until the overlay 205 fits either completely over the image of the remote agent 204 or over the image of the remote agent 204 according to a predetermined percentage. FIG. 2D illustrates an example screenshot of the image 204 illustrated in FIG. 2B in which the real time or substantially real time image of the remote agent 204 complies with the QA policies. In other words, the overlay 205 fits either completely over the image of the remote agent 204 or over the image of the remote agent 204 according to a predetermined percentage. Therefore, the prompt indicium 206 may be a green circle that is displayed with a text message that states that the adjustment complies with the QA policies so that the remote agent 104 may proceed with the communication session. Various types of shapes, circles, text messages, etc., may be utilized as the prompt indicium 206.

Figure 3:
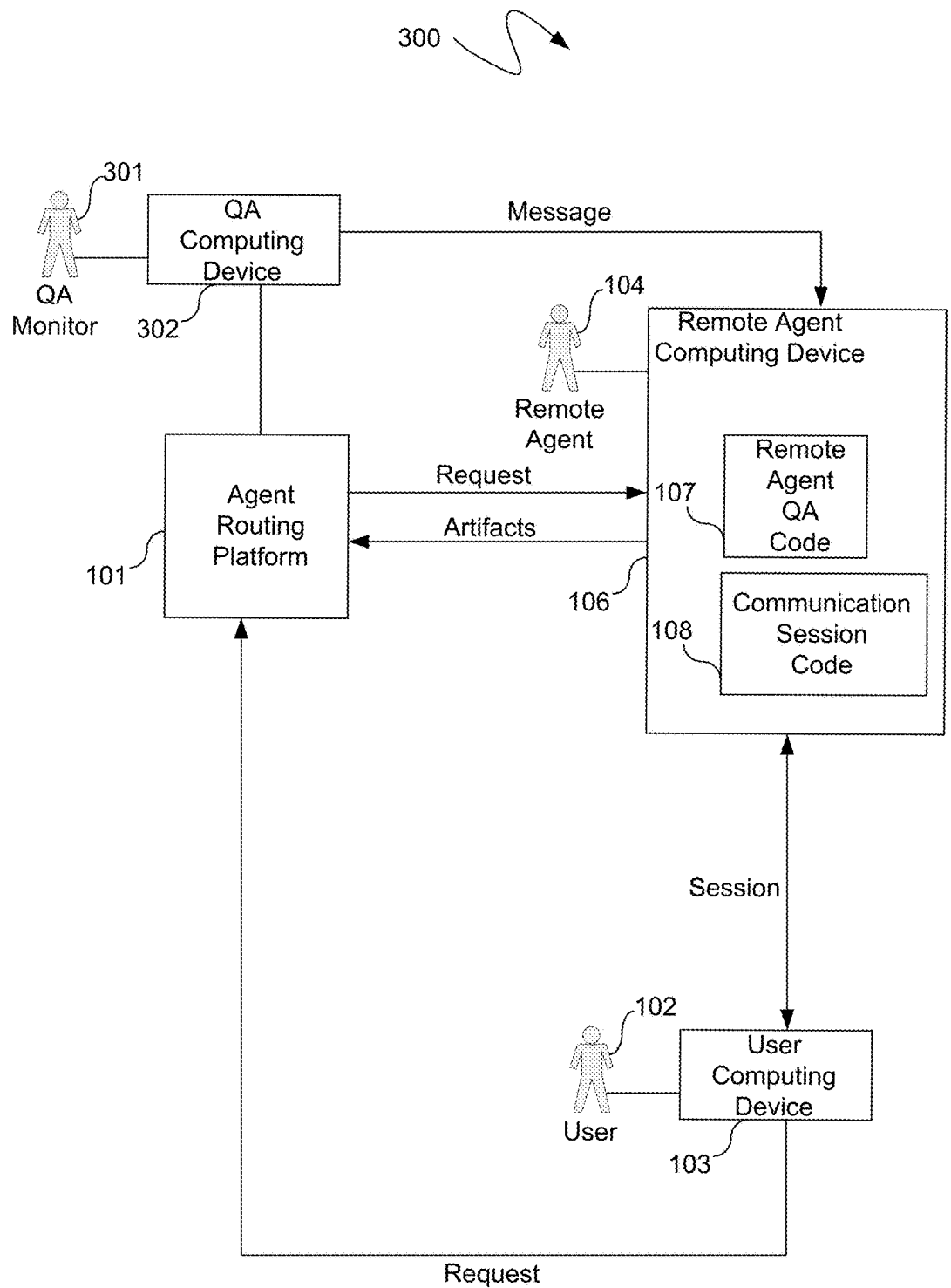
FIG. 3 illustrates a real time or substantially real time QA monitoring configuration.

Subsequent to a determination by the remote agent computing device 106 and/or the routing platform 101 that the remote agent 104 are in compliance with the QA policies prior to initiation of the communication session, monitoring of the communication session may also be performed to ensure that the communication session complies with the QA policies. FIG. 3 illustrates a real time or substantially real time QA monitoring configuration 300. In various embodiments, the real time or substantially real time QA monitoring configuration 300 includes the components illustrated in FIG. 1 in addition to a QA computing device 302 that is operated by a live human QA monitor 301 that monitors the communication session via a QA computing device 302. In various other embodiments, the QA computing device 302 automatically performs live monitoring of the communication session without the human QA monitor 301.

The live human QA monitor 301 monitors the communication session to ensure that compliance with the QA policies is maintained after pre-session compliance has been established by the remote agent QA code 107. For instance, the remote agent 104 may initially comply with the QA policies prior to initiation of the communication session as determined by the remote agent QA code 107, but then may move to a different location, e.g., a coffee shop, that would not comply with the QA policies. Accordingly, the live human QA monitor 301 may monitor continued compliance of the QA policies during the communication session. Further, the live human QA monitor 301 may generate a message, e.g., text message, e-mail, etc., during the communication session that is sent from the QA computing device 302 to the remote agent computing device 106 to inform the remote agent 104 of lack of compliance of a particular QA policy. The remote agent 104 may then receive that message in real time or substantially real time to adjust the service that is being provided to comply with the QA policies.

Further, the QA computing device 302 may perform analysis on the artifacts received by the agent routing platform 101 to determine compliance with the QA policies. For example, the QA computing device 302 may perform image analysis on video or image artifacts to determine compliant positioning of the remote agent 104, lighting, background imagery, etc. As another example, the QA computing device 302 may perform audio analysis on an audio artifact received from the agent routing platform 101 to determine compliant audio quality. The QA computing device 302 may be programmed to automatically perform such analyses upon receipt of artifacts from the agent routing platform 101, a system in operable communication with the agent routing platform 101, etc., or may perform such analyses at the request of the live human QA monitor 301. In addition, the QA computing device 302 may programmed to automatically send the message to the remote agent computing device 106 upon a determination of non-compliance of a QA policy or may be programmed to automatically alert the live QA human monitor 301 of the lack of compliance so that the live QA human monitor 301 may either send the message to the remote agent 104 or request that the remote agent computing device 106 send the message.

Figure 4:
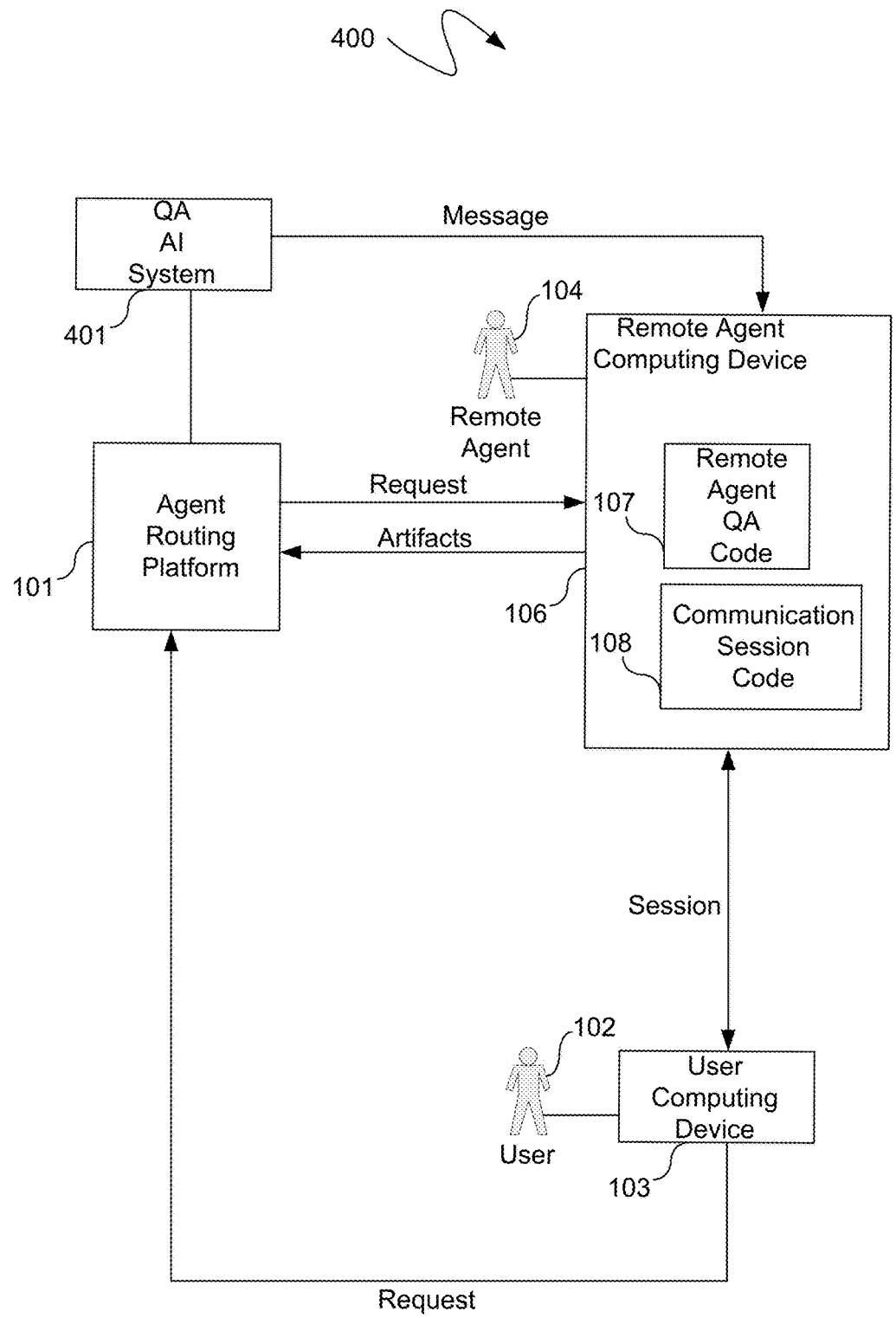
FIG. 4 illustrates an artificial intelligence ("AI") configuration in which a QA AI system is utilized in place of the live human QA monitor illustrated in FIG. 3.

Alternatively, the live QA monitoring may be performed without the human QA monitor 301. FIG. 4 illustrates an AI configuration in which a QA AI system 401 is utilized in place of the live human QA monitor 301 illustrated in FIG. 3. The QA AI system 401 may observe the live human QA monitor 301 to learn the process utilized by the live human QA monitor 301 in determining when the remote agent 104 is not complying with a QA policy and/or what types of messages to send to the remote agent 104 to inform the remote agent 104 of such a lack of compliance.

In various embodiments, the QA AI system 401 is provided with one or more predetermined thresholds of certainty for determining a lack of compliance. For example, the QA AI system 401 may be provided with a particular percentage of certainty associated with low audio quality that the QA AI system 401 has to have in order to determine that the remote agent 104 is not in compliance with the QA policy for audio quality and send a message to the remote agent 104 informing the remote agent 104 of the lack of compliance. Different predetermined thresholds may be utilized for different QA policies.

The messages provided by the live human QA monitor 301 of FIG. 3 or the QA AI system 401 of FIG. 4 may also be utilized to coach the remote agent 104. In other words, the messages may be utilized to provide instructions to the remote agent 104 on a manner in which the remote agent 104 may change a particular attribute from non-compliance to compliance with the QA policy.

Figure 5:
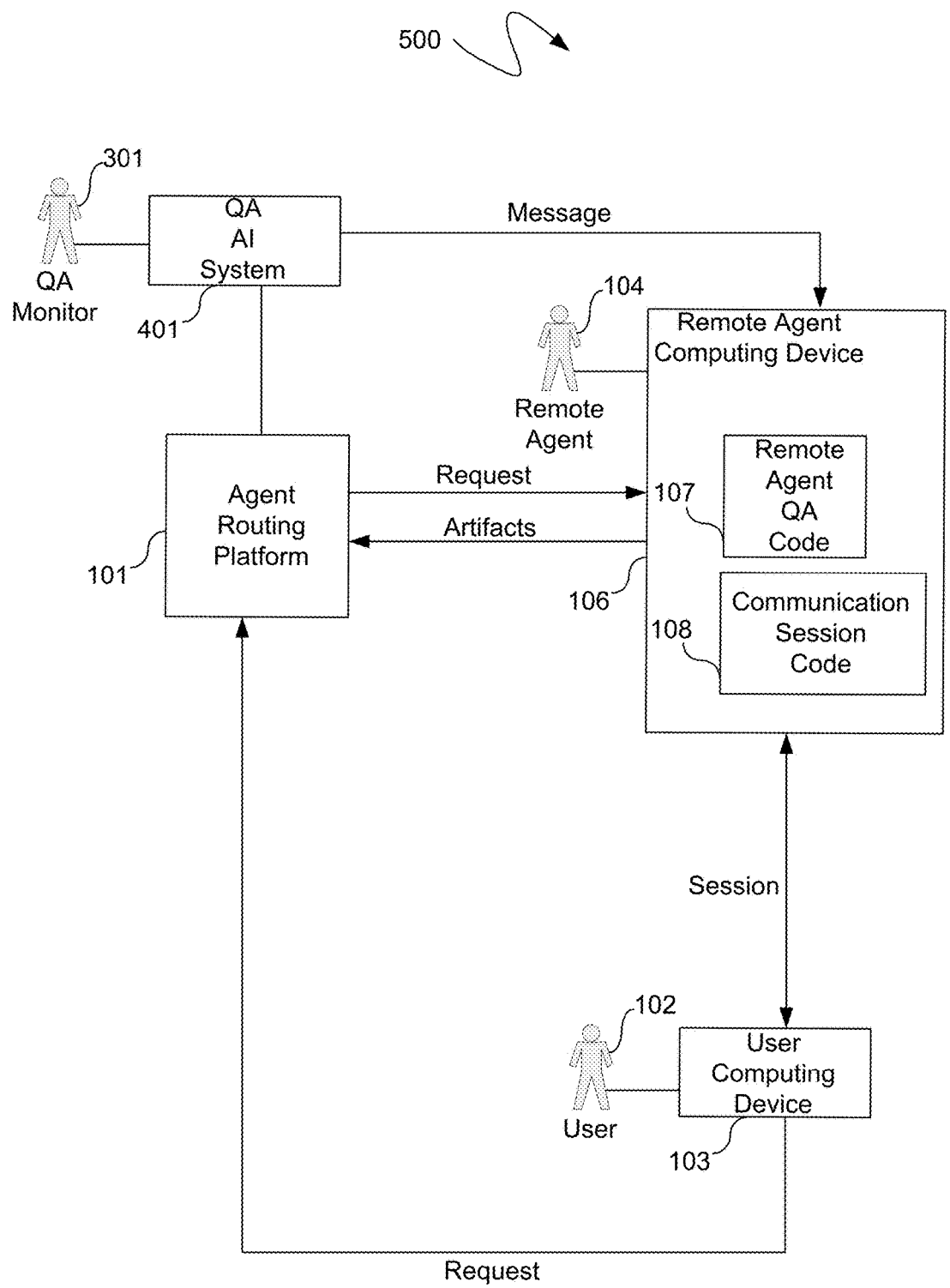
FIG. 5 illustrates a configuration in which the live human QA monitor of FIG. 3 is utilized in conjunction with the QA AI system of FIG. 4 to determine compliance of a QA policy of the agent routing platform.

FIG. 5 illustrates a configuration 500 in which the live human QA monitor 301 of FIG. 3 is utilized in conjunction with the QA AI system 401 of FIG. 4 to determine compliance of a QA policy of the agent routing platform 101. The live human QA monitor 301 monitors not only the compliance of the remote agent 104 of the QA policies, but also the decision process of the QA AI system 401 in determining whether or not the remote agent 104 is in compliance with the QA policies. The live human QA monitor 301 may then provide one or more inputs to the QA AI system that corrects decisions of the QA AI system 401. As a result, the QA AI system 401 may learn to improve the accuracy and quality of compliance decisions that may be performed without the live human QA monitor 301 whether or not the live human QA monitor 301 observes the compliance decisions of the QA AI system 401.

Figure 6:
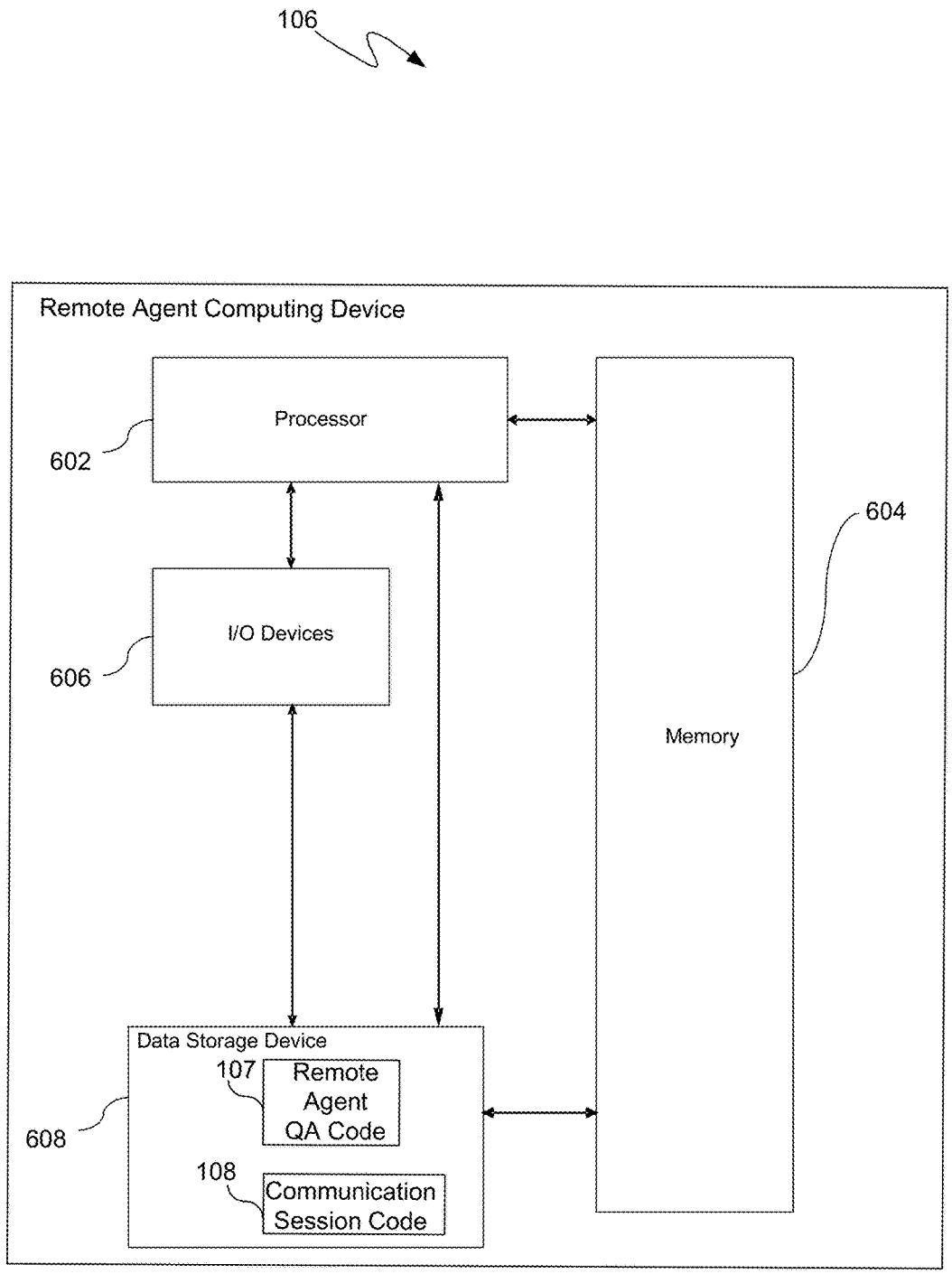
FIG. 6 illustrates the internal components of the remote agent computing device illustrated in FIG. 1.

FIG. 6 illustrates the internal components of the remote agent computing device 106 illustrated in FIG. 1. In various embodiments, the remote agent computing device 106 may be implemented utilizing a specialized processor. In various other embodiments, the remote agent computing device 106 may be implemented utilizing a general purpose computer or any other hardware equivalents. The remote agent computing device 106 comprises a processor 602, a memory 604, e.g., random access memory ("RAM") and/or read only memory ("ROM"), various input/output devices 606, e.g., a receiver, a transmitter, a user input device, a speaker, an image capture device, an audio capture device, etc., a data storage device 608, the remote agent QA code 107 stored on the data storage device 608, and the communication session code 108 stored on the data storage device 608.

The remote agent QA code 107 and/or the communication session code 108 may be represented by one or more software applications or a combination of software and hardware, e.g., using application specific integrated circuits ("ASIC"), where the software is loaded from a storage device such as a magnetic or optical drive, diskette, or non-volatile memory and operated by the processor 602 in the memory 604 of the computer. As such, the remote agent QA code 107 and/or the communication session code 108 and associated data structures may be stored on a computer readable medium such as a computer readable storage device, e.g., RAM memory, magnetic or optical drive or diskette, etc. The internal components of the remote agent computing device 106 may be utilized for a hardware implementation of any of the configurations provided herein. For example, the agent routing platform 101 illustrated in FIG. 1, the user computing device 103 illustrated in FIG. 1, the QA computing device 302 illustrated in FIG. 3, and/or the QA AI system 401 illustrated in FIG. 4 may utilize such internal components in addition to corresponding code stored on the data storage device 608.

Figure 7:
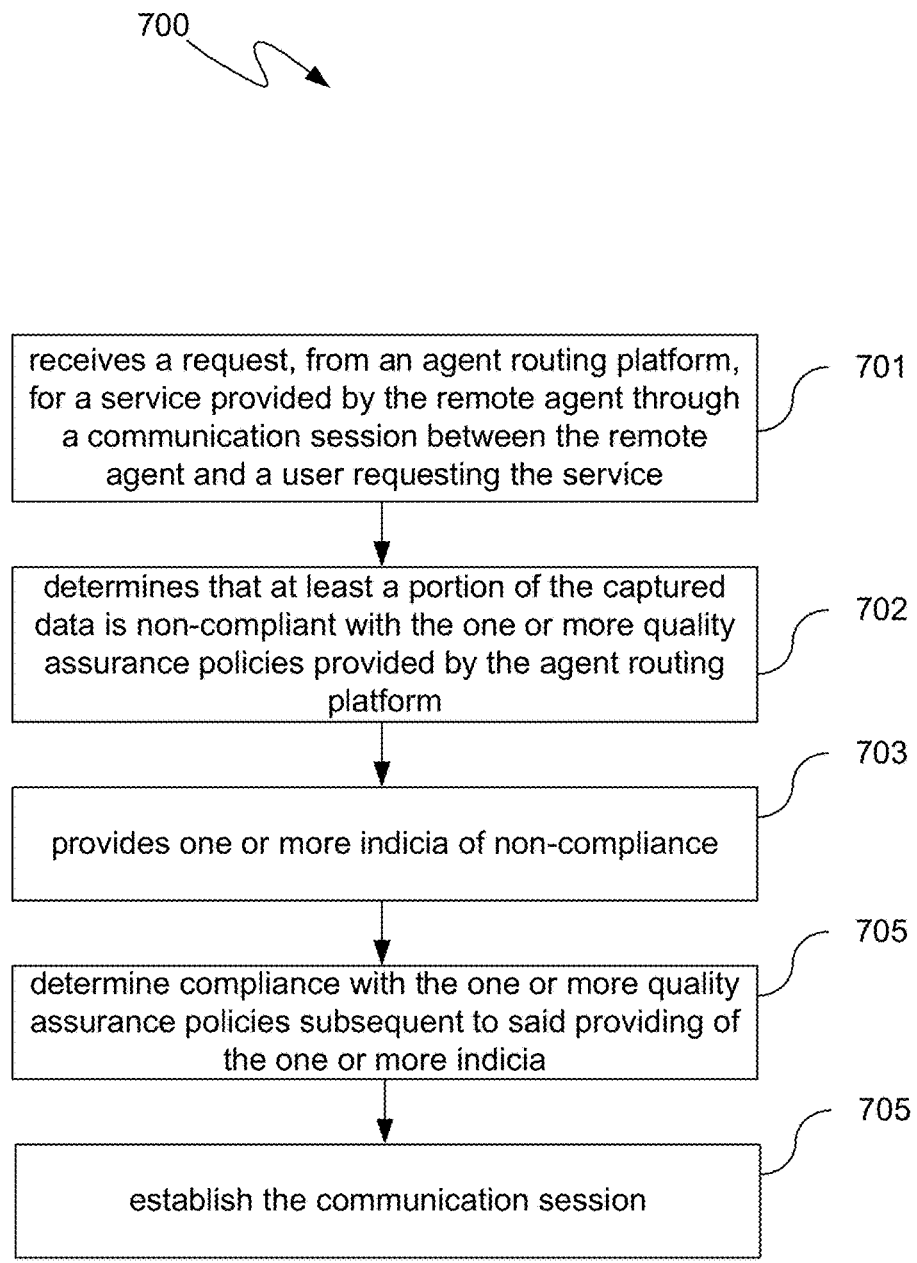
FIG. 7 illustrates a process that may be utilized by the remote agent computing device illustrated in FIG. 1 to determine pre-session compliance with the QA policies of the agent routing platform.

FIG. 7 illustrates a process 700 that may be utilized by the remote agent computing device 106 illustrated in FIG. 1 to determine pre-session compliance with the QA policies of the agent routing platform 101. At a process block 701, the process 700 receives a request, from an agent routing platform, for a service provided by the remote agent through a communication session between the remote agent and a user requesting the service. Further, at a process block 702, the process 700 executes the remote agent quality assurance code to determine that at least a portion of the captured data is non-compliant with the one or more quality assurance policies provided by the agent routing platform. In addition, at a process block 703, the process 700 provides one or more indicia of non-compliance. At a process block 704, the process 700 determines compliance with the one or more quality assurance policies subsequent to said providing of the one or more indicia. Further, at a process block 705, the process 700 establishes the communication session.

Figure 8:
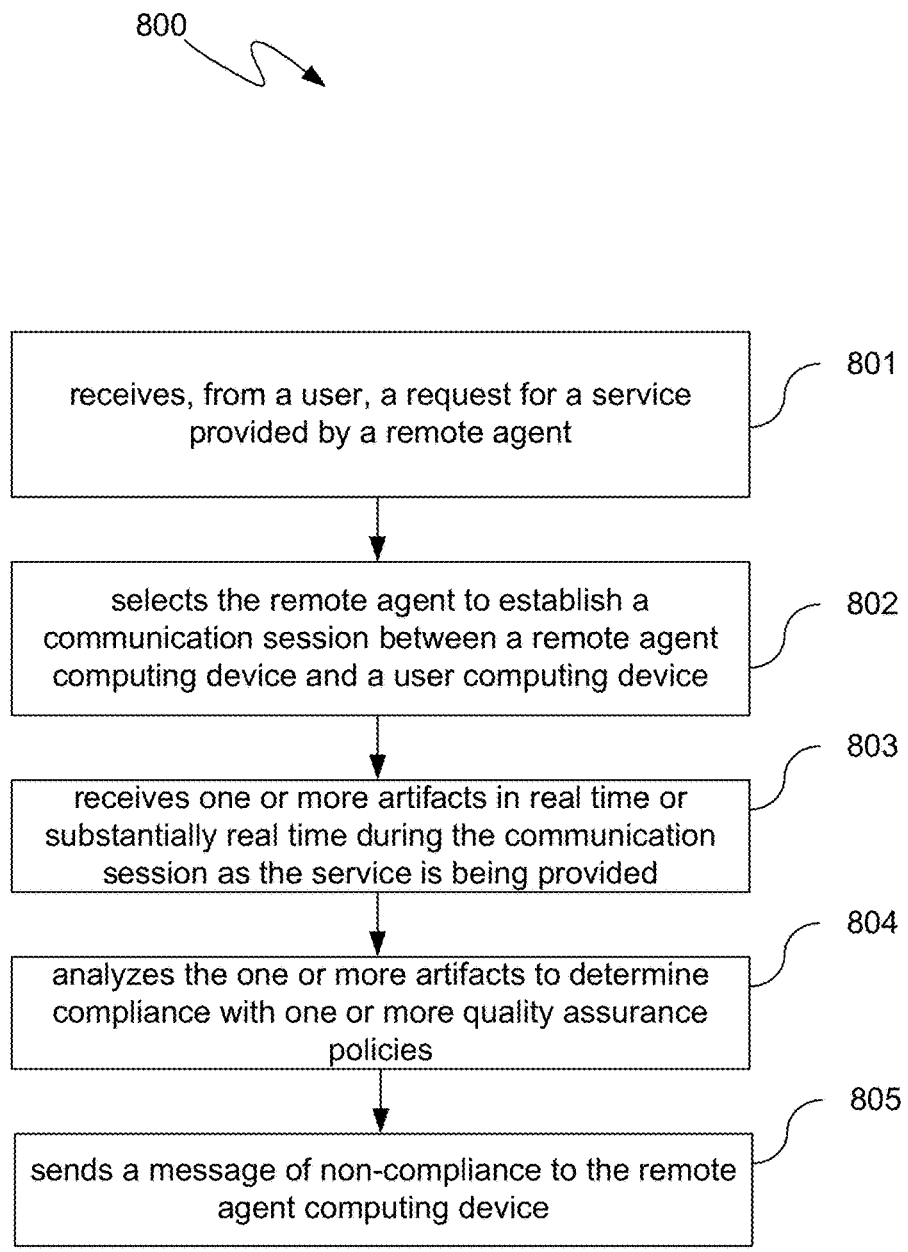
FIG. 8 illustrates a process that may be utilized by the agent routing platform illustrated in FIG. 1 to determine compliance with the QA policies of the agent routing platform in real time or substantially real time during the communication session.

FIG. 8 illustrates a process 800 that may be utilized by the agent routing platform 101 illustrated in FIG. 1 to determine compliance with the QA policies of the agent routing platform 101 in real time or substantially real time during the communication session. At a process block 801, the process 800 receives, from a user, a request for a service provided by a remote agent. Further, at a process block 802, the process 800 selects the remote agent to establish a communication session between a remote agent computing device and a user computing device. In addition, at a process block 803, the process 800 receives one or more artifacts in real time or substantially real time during the communication session as the service is being provided. At a process block 804, the process 800 also analyzes the one or more artifacts to determine compliance with one or more quality assurance policies. Further, at a process block 805, the process 800 sends a message of non-compliance to the remote agent computing device.

The processes described herein may be implemented in a specialized processor that is specifically configured to determine compliance of a QA policy. Alternatively, such processes may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium such as a computer readable storage device. The instructions may also be created using source code or any other known computer-aided design tool. A computer readable medium may be any medium capable of storing those instructions and include a CD-ROM, DVD, magnetic or other optical disc, tape, silicon memory, e.g., removable, non-removable, volatile or non-volatile, etc.

Figure 9:
FIG. 9 illustrates an example screenshot of a monitor dashboard that may be utilized by a human QA monitor illustrated in FIG. 3 and/or the QA AI system illustrated in FIG. 4.

FIG. 9 illustrates an example screenshot of a monitor dashboard 900 that may be utilized by a human QA monitor 301 illustrated in FIG. 3 and/or the QA AI system 401 illustrated in FIG. 4. The monitor dashboard 901 allows the human QA monitor 301 and/or the QA AI system 401 to simultaneously monitor compliance of multiple remote agents 104 in real time or substantially real time during the communication session. As an example, the monitor dashboard 901 may display nine different images 204 for nine different remote agents 104. Further, the monitor dashboard 901 may display nine different prompt indicia 206. In various embodiments, the QA AI system 401 or the QA computing device 302 is programmed to automatically detect if any of the prompt indicia 206 are not in compliance, e.g., a circle that is of a color other than green. The QA AI system 401 or the QA computing device 302 may also be automatically programmed to alert the human QA monitor 301 of the lack of compliance with the QA policies. As an example, the QA AI system 401 or the QA computing device 302 may detect that the overlay 205 for the fifth remote agent 104 and the overlay 205 for the ninth remote agent 104 are not completely over the corresponding images 204 or over the corresponding images 204 by a predetermined percentage. The QA AI system 401 or the QA computing device 302 may be programmed to then automatically send an alert, e.g., a text message, to the human QA monitor 301 to review the compliance of the fifth remote agent 104 and the ninth remote agent 104. Further, the human QA monitor 301 may also communicate directly with the fifth remote agent 104 and the ninth remote agent 104 to provide feedback for compliance with the QA policies. In various other embodiments, the QA AI system 401 or the QA computing device 302 may be programmed to automatically communicate with the fifth remote agent 104 and the ninth remote agent 104 to provide feedback for compliance with the QA policies without a human QA monitor 301. Various quantities of remote agents 104 may be simultaneously displayed.

A computer is herein intended to include any device that has a general, multi-purpose or single purpose processor as described above. For example, a computer may be a PC, laptop computer, set top box, cell phone, smartphone, tablet device, portable media player, video player, etc.

It is understood that the computer program products, apparatuses, systems, and processes described herein may also be applied in other types of apparatuses, systems, and processes. Those skilled in the art will appreciate that the various adaptations and modifications of the embodiments of the compute program products, apparatuses, systems, and processes described herein may be configured without departing from the scope and spirit of the present computer program products, apparatuses, systems, and processes. Therefore, it is to be understood that, within the scope of the appended claims, the present computer program products, apparatuses, systems, and processes may be practiced other than as specifically described herein.

We claim:

1. An apparatus comprising:
   a data storage device that stores remote agent quality assurance code and communication session code;
   an image capture device that captures an image associated with a remote agent as a calibration image, the remote agent being positioned in proximity to the image capture device;
   a processor that receives a request, from an agent routing platform, for a service provided by the remote agent through a communication session between the remote agent and a user requesting the service, executes the remote agent quality assurance code to determine that at least a portion of the captured image is non-compliant with one or more quality assurance policies provided by the agent routing platform, executes the remote agent quality assurance code to display one or more visual indicia of non-compliance, executes the remote agent quality assurance code to display an overlay of compliant positioning with respect to at least a portion of the calibration image, executes the remote agent quality assurance code to determine that an adjustment of the calibration image fits within at least a predetermined percentage of the overlay subsequent to said displaying of the overlay to obtain compliance, and executes the communication session code subsequent to said determination of compliance to establish the communication session.

2. The apparatus of claim 1, wherein the communication session is established based on browser-to-browser communication.

3. The apparatus of claim 1, further comprising a display device on which the processor displays the one or more indicia.

4. The apparatus of claim 1, wherein the one or more indicia provide data on changing an attribute to bring the attribute into compliance with the one or more quality assurance policies.

5. The apparatus of claim 1, wherein the data capture device is an image capture device.

6. The apparatus of claim 1, wherein the data capture device is an audio capture device.

7. The apparatus of claim 1, wherein the one or more quality assurance policies are associated with an image of the remote agent captured by the data capture device.

8. The apparatus of claim 1, wherein the one or more quality assurance policies are associated with positioning of the remote agent with respect to the data capture device.

9. The apparatus of claim 1, wherein the one or more quality assurance policies are associated with an audio level of a voice of the remote agent captured by the data capture device.

10. The apparatus of claim 1, wherein the service provides language interpretation/translation.

11. A computer implemented platform comprising:
a processor that receives, from a user, a request for a service provided by a remote agent, selects the remote agent to establish a communication session between a remote agent computing device and a user computing device, receives one or more video artifacts in real time or substantially real time during the communication session as the service is being provided, analyzes the one or more video artifacts to determine compliance with one or more quality assurance policies, sends a message of non-compliance to the remote agent computing device so that the remote agent computing device executes remote agent quality assurance code to display an overlay of compliant positioning with respect to at least a portion of a calibration image displayed at the remote agent computing device, executes the remote agent quality assurance code to determine that an adjustment of the calibration image fits within at least a predetermined percentage of the overlay subsequent to said displaying of the overlay to obtain compliance, and executes the communication session code subsequent to said determination of compliance to establish the communication session.

12. The computer implemented platform of claim 11, wherein the processor is associated with an artificial intelligence system that learns compliance determination by observing a human quality assurance monitor performing the compliance determination during the communication session.

13. The computer implemented platform of claim 11, wherein the processor automatically performs compliance determination during the communication session.

14. The computer implemented platform of claim 11, wherein the processor is associated with an artificial intelligence system that improves accuracy of compliance determination by receiving one or more inputs from a human quality assurance monitor during the communication session.

15. The computer implemented platform of claim 11, wherein the processor is associated with an artificial intelligence system that determines the compliance by comparing a certainty level with a predetermined threshold for the one or more quality assurance policies.

16. The computer implemented platform of claim 11, wherein the communication session is established based on browser-to-browser communication.

17. The computer implemented platform of claim 11, wherein the one or more artifacts are captured at a data capture device associated with the remote agent computing device.

18. The computer implemented platform of claim 11, wherein the processor automatically performs an image analysis on the one or more artifacts to determine the compliance.

19. The computer implemented platform of claim 11, wherein the processor automatically performs an audio analysis on the one or more artifacts to determine the compliance.

20. The computer implemented platform of claim 11, wherein the service provides language interpretation/translation.

* * * * *